(12) United States Patent
Mao et al.

(10) Patent No.: US 11,784,549 B2
(45) Date of Patent: Oct. 10, 2023

(54) MOTOR

(71) Applicant: AAC Technologies Pte. Ltd., Singapore (SG)

(72) Inventors: Lubin Mao, Shenzhen (CN); Zhaoxian Chen, Shenzhen (CN); Zijie Zhang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 701 days.

(21) Appl. No.: 16/994,689

(22) Filed: Aug. 17, 2020

(65) Prior Publication Data

US 2020/0412227 A1 Dec. 31, 2020

Related U.S. Application Data

(63) Continuation of application No. PCT/CN2019/093989, filed on Jun. 29, 2019.

(51) Int. Cl.
*H02K 33/18* (2006.01)
*G06F 3/01* (2006.01)
*H04M 1/02* (2006.01)

(52) U.S. Cl.
CPC .............. *H02K 33/18* (2013.01); *G06F 3/016* (2013.01); *H04M 1/026* (2013.01)

(58) Field of Classification Search
CPC ......... G06F 3/016; H02K 33/18; H04M 1/026
USPC ........................................................ 310/28
See application file for complete search history.

(56) References Cited

U.S. PATENT DOCUMENTS

| | | | |
|---|---|---|---|
| 9,614,425 B2 * | 4/2017 | Jin | H02K 33/12 |
| 9,929,630 B2 * | 3/2018 | Mao | H02K 33/16 |
| 2011/0018364 A1 * | 1/2011 | Kim | H02K 33/18 |
| | | | 310/20 |
| 2016/0226362 A1 * | 8/2016 | Wang | H02K 33/16 |
| 2017/0033627 A1 * | 2/2017 | Xu | H02K 1/34 |
| 2017/0033664 A1 * | 2/2017 | Xu | H02K 33/18 |
| 2017/0033665 A1 * | 2/2017 | Xu | H02K 5/04 |
| 2017/0033666 A1 * | 2/2017 | Xu | H02K 33/16 |
| 2017/0033667 A1 * | 2/2017 | Xu | H02K 33/16 |
| 2017/0033668 A1 * | 2/2017 | Xu | H02K 33/16 |
| 2017/0033669 A1 * | 2/2017 | Xu | H02K 33/16 |
| 2017/0033670 A1 * | 2/2017 | Xu | H02K 33/16 |

(Continued)

FOREIGN PATENT DOCUMENTS

| | | | |
|---|---|---|---|
| CN | 106817006 A | * | 6/2017 |
| CN | 207021881 U | * | 2/2018 |

(Continued)

*Primary Examiner* — Alex W Mok
(74) *Attorney, Agent, or Firm* — W&G Law Group

(57) ABSTRACT

The present disclosure provides a motor, including a housing having an accommodating space, a vibrator and a stator that are accommodated in the accommodating space. One of the vibrator and the stator includes a magnetic circuit structure, and the other includes a coil assembly. The coil assembly includes an iron core and a first drive coil and a second drive coil that separately sleeved on two ends of the iron core in a vibration direction of the vibrator, a powering direction of the first drive coil being opposite to a powering direction of the second drive coil. In the present disclosure, the first drive coil and the second drive coil are subjected to Lorentz force in the same direction, thereby vibration of the motor may be improved.

20 Claims, 9 Drawing Sheets

(56) References Cited

U.S. PATENT DOCUMENTS

| | | | | |
|---|---|---|---|---|
| 2017/0033671 A1* | 2/2017 | Xu | ..................... | H02K 33/16 |
| 2017/0033672 A1* | 2/2017 | Xu | ..................... | H02K 33/16 |
| 2017/0288521 A1* | 10/2017 | Jin | ..................... | H02K 33/18 |
| 2018/0111163 A1* | 4/2018 | Xu | ..................... | B06B 1/045 |

FOREIGN PATENT DOCUMENTS

| | | | | | |
|---|---|---|---|---|---|
| CN | 207021883 U | * | 2/2018 | | |
| CN | 208589893 U | * | 3/2019 | ............. | H02K 33/12 |

* cited by examiner

MOTOR

TECHNICAL FIELD

The present disclosure relates to the technical field of motor structure, in particular a motor used for mobile electronic device such as a mobile phone.

BACKGROUND

In current market, a motor does not have a strong drive force. A stator of the motor is a single coil generating only Lorentz force as a drive force, thereby the drive force of the motor is not sufficiently generated.

Therefore, it is necessary to provide a motor to solve the problem that the stator is a single coil generating only Lorentz force as a drive force and that the drive force of the motor is not sufficiently generated.

SUMMARY

The present disclosure aims to provide a motor that not only uses electromagnetic force, but also uses Lorentz force to sufficiently generate its drive force.

The technical solutions of the present disclosure are as follows:

In order to realize the above objective, the present disclosure provides a motor, including a housing having an accommodating space, a vibrator and a stator that are accommodated in the accommodating space. One of the vibrator and the stator includes a magnetic circuit structure, and the other includes a coil assembly. The coil assembly includes an iron core, a first drive coil and a second drive coil that separately sleeved on two ends of the iron core in a vibration direction of the vibrator, a powering direction of the first drive coil being opposite to a powering direction of the second drive coil. The magnetic circuit structure includes a first magnetic steel disposed at two sides of the first drive coil where poles with the same polarity are facing each other in a direction perpendicular to the vibration direction, and a second magnetic steel disposed at two sides of the second drive coil where poles with the same polarity are facing each other in a direction perpendicular to the vibration direction. The first magnetic steel and the second magnetic steel that are at the same side of the coil assembly are magnetized in a direction perpendicular to the vibration direction; the first magnetic steel and the second magnetic steel that are at the same side of the coil assembly are magnetized in opposite directions.

As an improvement, the motor includes even numbers of first magnetic steels and second magnetic steels respectively, each two of the first magnetic steels as a group are symmetrically disposed at two opposite sides of the first drive coil, and each two of the second magnetic steels as a group are symmetrically disposed at two opposite sides of the second drive coil.

As an improvement, the magnetic circuit structure further includes a magnetic conductive member that fixes the first magnetic steel and the second magnetic steel, the magnetic conductive member disposed separately at two opposite sides of the coil assembly.

As an improvement, the vibrator further includes a weight block, the magnetic circuit structure is fixed within the weight block, the weight block is suspended within the accommodating space. The weight block includes two first side walls disposed in parallel separately and space apart, and two second side walls disposed at two ends of the first side walls and connecting the two first side walls. The first side walls and the second side walls are connected end to end to form an accommodating cavity. The magnetic circuit structure and the coil assembly are fixed within the accommodating cavity, the magnetic conductive member is fixed on the first side walls, and the coil assembly is fixed within the housing and extends into the accommodating cavity.

As an improvement, the motor further includes a third magnetic steel located at two opposite sides of the coil assembly, and the third magnetic steel is installed on the second side walls and is disposed at intervals opposite to the coil assembly.

As an improvement, the motor further includes a pole core sandwiched between the third magnetic steel and the second side wall.

As an improvement, the iron core includes a body portion extending in the vibration direction and a separation portion protruding at the body portion, the first drive coil and the second drive coil are separately sleeved on two sides of the body portion, and the separation portion is sandwiched between the first drive coil and the second drive coil.

As an improvement, the separation portion is of a ring sheathing the body portion.

As an improvement, the motor further includes a plurality of stopping blocks provided protruding from the housing, and the vibrator is correspondingly provided with recessing grooves matching the stopping blocks.

As an improvement, the motor further includes an elastic support suspending the vibrator and supporting the vibrator in the accommodating space. The elastic support includes a first fixing arm fixed to the housing, a second fixing arm disposed separated from the first fixing arm and fixed to the vibrator, and an elastic arm connecting the first fixing arm and the second fixing arm.

The present disclosure is advantageous in that: in the present disclosure, when the first drive coil and the second drive coil are powered on with current from different directions, because of opposite polarities of the first and second magnetic steels that correspond to the first and second drive coils, the first drive coil and the second drive coil are subjected to Lorentz force in the same direction, thereby stress to the vibrator may be effectively increased, and vibration may be improved. When a third magnetic steel is added to both sides of the coil assembly, an induced magnetic field generated when the first drive coil and the second drive coil are powered on interacts with a permanent magnetic field generated by the third magnetic steel, thereby stress to the vibrator may be further increased, and vibration of the motor may be improved.

Figure 1:
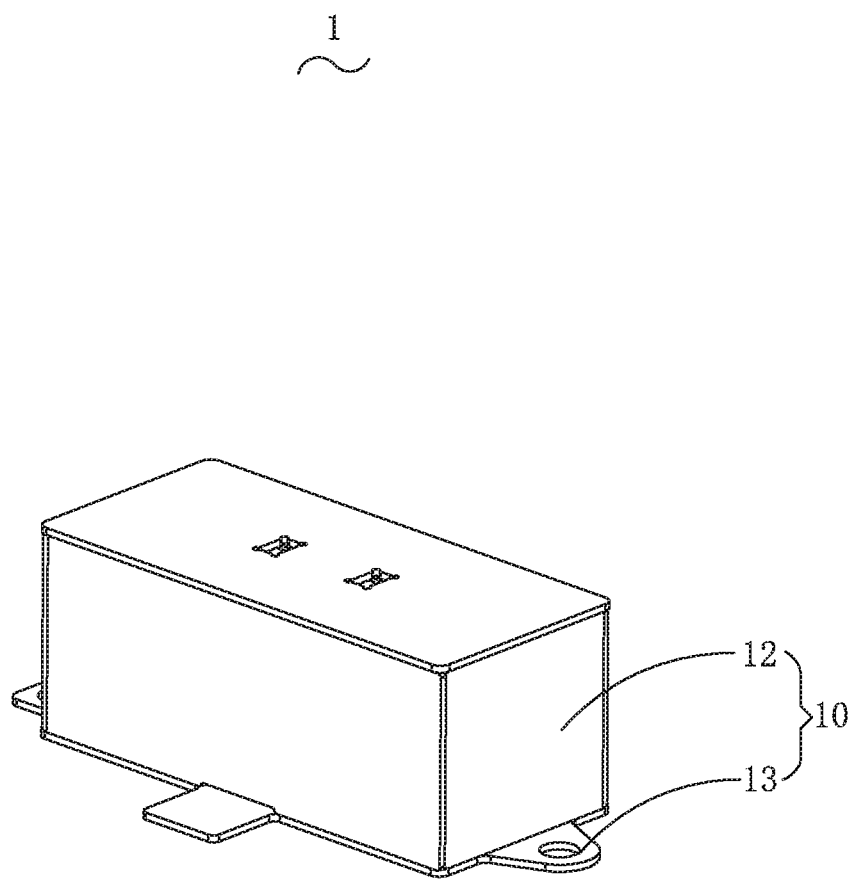
FIG. 1 is a stereoscopic view of a motor according to Embodiment 1 of the present disclosure.

Reference signs: 1, motor; 10: housing; 11, accommodating space; 12, housing; 121, concave cavity; 122, cavity opening; 13, base plate; 20, vibrator; 21, magnetic circuit structure; 211, first magnetic steel; 212, second magnetic steel; 213, magnetic conductive member; 22, weight block; 221, first side wall; 222, second side wall; 223, accommodating cavity; 224, recessing grooves; 23, third magnetic steel; 24, pole core; 30, stator; 31, coil assembly; 311, iron core; 312, first drive coil; 313, second drive coil; 314, body portion; 315, separation portion; 40, stopping block; 50, elastic support; 51, first fixing arm; 52, second fixing arm; 53, elastic arm.

DETAILED DESCRIPTION

A further description is provided on the present disclosure with reference to the drawings and embodiments.

It shall be noted that in the present disclosure, all directional expressions (such as up, down, inner, outer, top, bottom, etc.) are merely used for explaining relationships of relevant locations between different parts under a certain circumstance (as shown in the drawings). If a circumstance changes, a directional expression changes also.

It shall be noted that when an element is expressed as "fixed to" or "disposed on" another element, the former element may be directly on the other element, or there may be a third element in between. When an element is expressed as "connected to" another element, the former element may be directly connected to the other element, or there may be a third element in between.

Embodiment 1

Referring to FIG. 1 to FIG. 7, an embodiment of the present disclosure provides a motor 1, including a housing 10, a vibrator 20 and a stator 30. The housing 10 has an accommodating space 11 in which the vibrator 20 and the stator 30 are accommodated. One of the vibrator 20 and the stator 30 includes a magnetic circuit structure 21 and a weight block 22, and the other one includes a coil assembly 31. The stator 30 may drive the vibrator 20 to vibrate in the accommodating space 11. Specifically, the vibrator includes the magnetic circuit structure 21 and the weight block 22, the stator 30 includes the coil assembly 31, the magnetic circuit structure 21 is fixed in the weight block 22, the weight block 22 is suspended in the accommodating space 11, and the magnetic circuit structure 21 moves along with the weight block 22.

Figure 2:
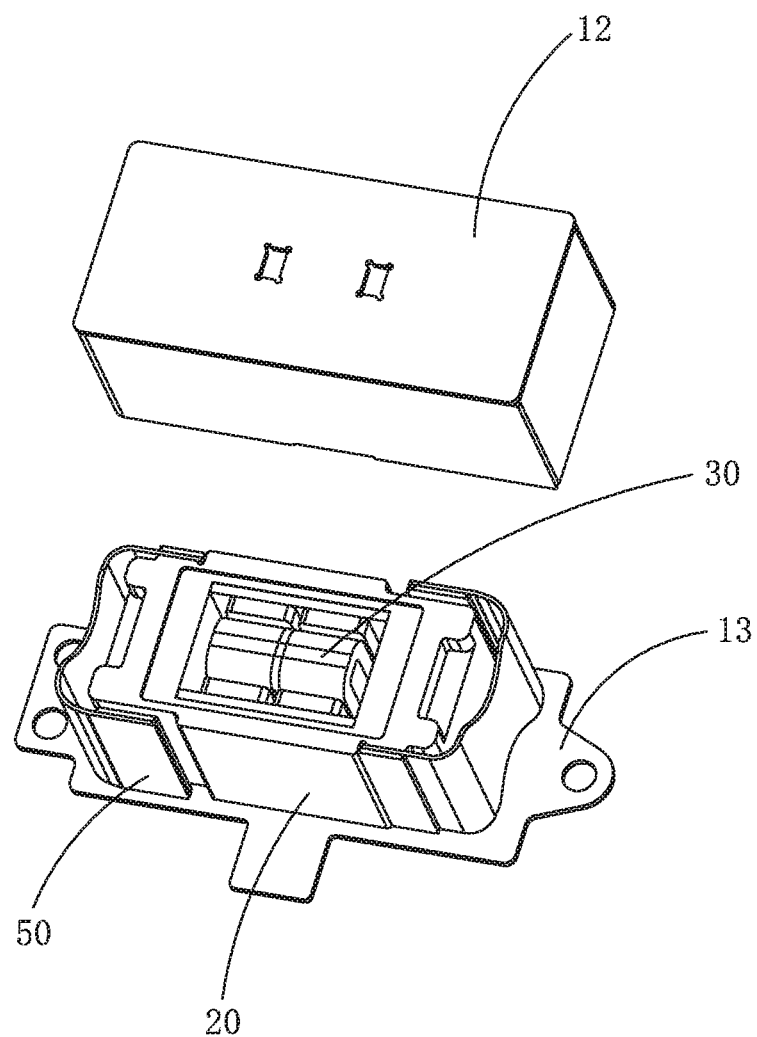
FIG. 2 is an exploded view 1 of the motor according to Embodiment 1 of the present disclosure.
Figure 3:
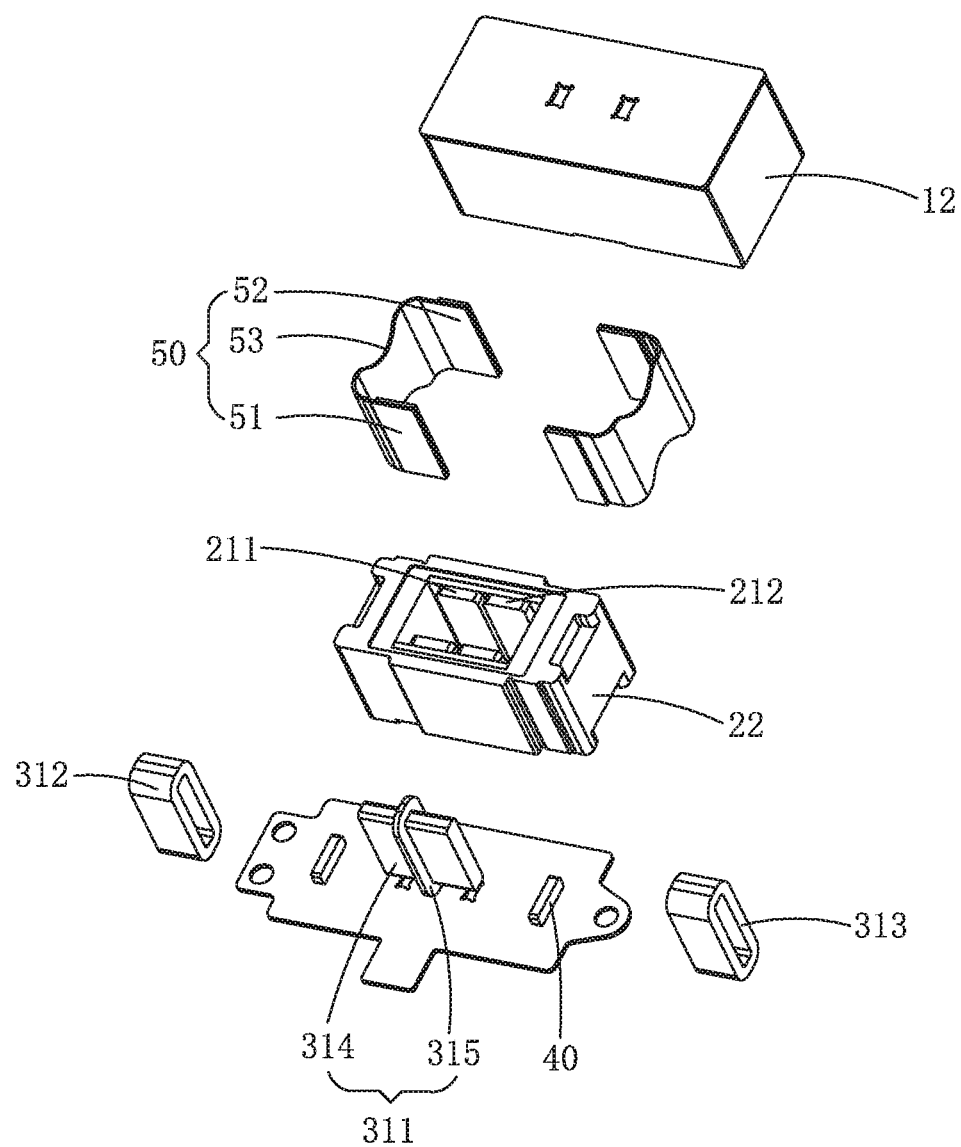
FIG. 3 is an exploded view 2 of the motor according to Embodiment 1 of the present disclosure.

Referring to FIG. 1 to FIG. 3, the coil assembly 31 includes an iron core 311, a first drive coil 312 and a second drive coil 313. The iron core 311 includes a body portion 314 extending in a vibration direction of the vibrator 20 and a separation portion 315 protruding at the body portion 314. The separation portion 315 is of a ring sheathing the body portion 314. The first drive coil 312 and the second drive coil 313 are separately sleeved on two sides of the body portion 314 in the vibration direction of the vibrator 20. The separation portion 315 is sandwiched between the first drive coil 312 and the second drive coil 313. The separation portion 315 is connected with the housing 10. The first drive coil 312 and the second drive coil 313 are powered on in opposite directions. The iron core 311 may be magnetized when the first drive coil 312 and the second drive coil 313 are powered on with current from different directions.

Figure 4:
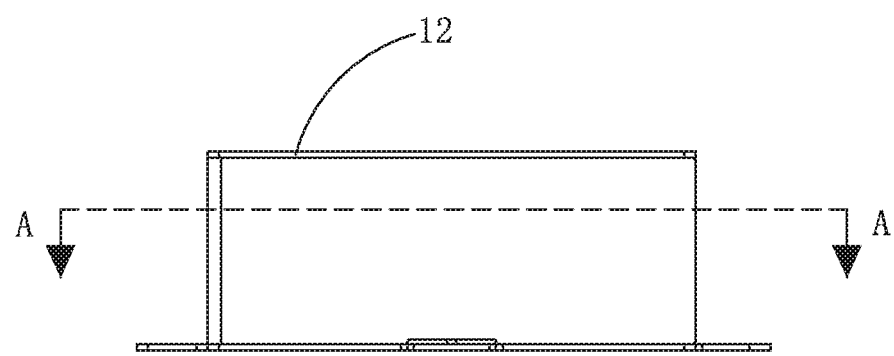
FIG. 4 is a left view of the motor according to Embodiment 1 of the present disclosure.
Figure 5:
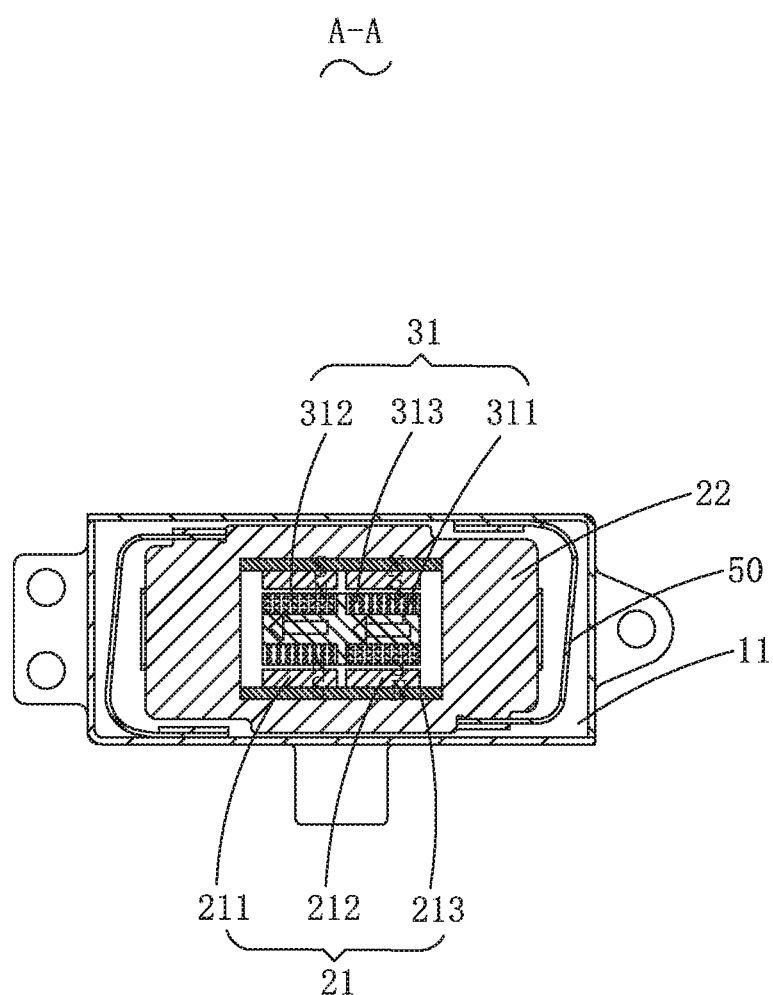
FIG. 5 is a sectional view of A-A in FIG. 4.
Figure 6:
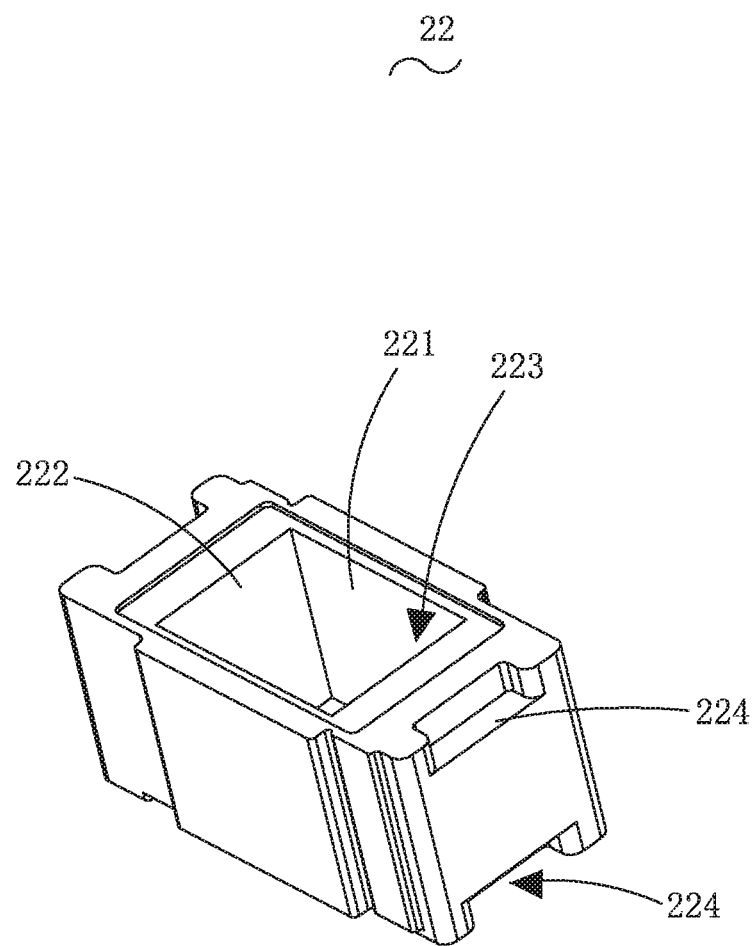
FIG. 6 is a stereoscopic view of a weight block according to Embodiment 1 of the present disclosure.

Referring to FIG. 4 to FIG. 6, preferably, the weight block 22 includes two first side walls 221 that are disposed in parallel and spaced apart, and two second side walls 222 that are disposed at two ends of the first side walls 221 and connecting the two first side walls 221. The first side walls 221 and the second side walls 222 are connected end to end to form an accommodating cavity 223. The magnetic circuit structure 21 and the coil assembly 31 are fixed in the accommodating cavity 223. The coil assembly 31 is specifically fixed on the housing 10 and extends into the accommodating cavity 223. In this way, assembling connection between the magnetic circuit structure 21, the coil assembly 31 and the weight block 22 is further embodied.

In this embodiment, the magnetic circuit structure 21 includes a first magnetic steel 211 and a second magnetic steel 212. There are even numbers of first magnetic steels 211 and second magnetic steels 212 respectively. The first magnetic steels 211 with each two as a group are disposed at two opposite sides of the first drive coil 312, and the second magnetic steels 212 with each two as a group are symmetrically disposed at two opposite sides of the second drive coil 313. In this way, the vibrator 20 is stabler when vibrating.

Preferably, the first magnetic steel 211 is disposed at two sides of the first drive coil 312 in a direction perpendicular to the vibration direction and is arranged such that poles with the same polarity are facing each other, and the second magnetic steel 212 is disposed at two sides of the second drive coil 313 in a direction perpendicular to the vibration direction and is arranged such that poles with the same polarity are facing each other. The magnetic circuit structure 21 further includes a magnetic conductive member 213 that fixes the first magnetic steel 211 and the second magnetic steel 212, the magnetic conductive member 213 disposed separately at two opposite sides of the coil assembly 31. Specifically, there are two first magnetic steels 211, two second magnetic steels 212 and two magnetic conductive members 213. One first magnetic steel 211 and one second magnetic steel 212 are fixed to one first side wall 221 through one magnetic conductive member 213, while the other first magnetic steel 211 and the other second magnetic steel 212 are fixed to the other first side wall 221 through the other magnetic conductive member 213.

In this embodiment, the first magnetic steel 211 and the second magnetic steel 212 that are at the same side of the coil assembly 31 are magnetized in a direction perpendicular to the vibration direction, and the first magnetic steel 211 and the second magnetic steel 212 that are at the same side of the coil assembly 31 are magnetized in opposite directions. Specifically, as shown in FIG. 5, when the first drive coil 312 and the second drive coil 313 are powered on with current from different directions, the first drive coil 312 and the second drive coil 313 are subjected to Lorentz force in the same direction, thereby stress to the vibrator 20 may be effectively increased, and vibration may be improved. An arrow in FIG. 5 shows a direction of the stress.

Figure 7:
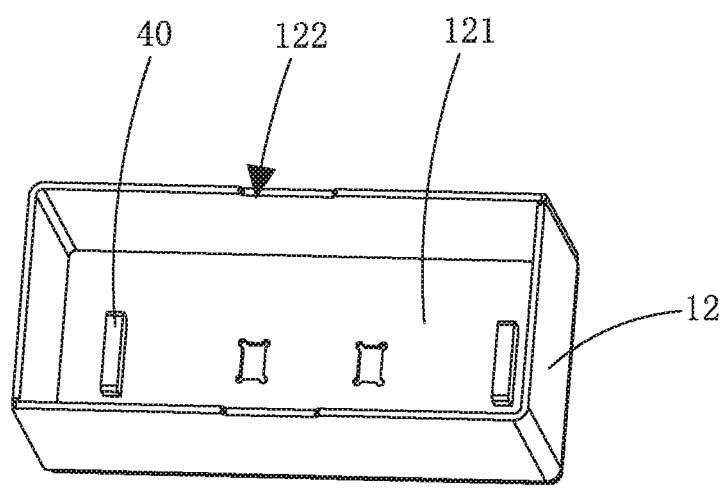
FIG. 7 is a stereoscopic view that two stopping blocks are installed on the housing according to Embodiment 1 of the present disclosure.

Preferably, with further referring to FIG. 7, the housing 10 of the present disclosure includes a housing 12 having a concave cavity 121 and a base plate 13 covering a cavity opening 122 of the concave cavity 121. The vibrator 20 is slidably installed on the base plate 13. The motor 1 further includes a plurality of stopping blocks 40 provided protruding from the housing 10. In this embodiment, there are four stopping blocks 40, two of which provided protruding from the base plate 13, and the other two of which separately protrude from a cavity base surface of the concave cavity. The weight block 22 is provided with recessing grooves 224 matching the stopping blocks 40, so that vibration of the vibrator 20 is transmitted outwards.

Besides, referring to FIG. 1 and FIG. 3, the motor 1 further includes an elastic support 50 suspending the vibrator 20 and supporting the vibrator 20 in the accommodating space 11. The elastic support 50 specifically includes a first fixing arm 51, a second fixing arm 52 and an elastic arm 53. One end of the first fixing arm 51 is fixed to the housing 10. The second fixing arm 52 and the first fixing arm 51 are disposed and spaced apart. One end of the second fixing arm 52 is fixed to the vibrator 20. Two ends of the elastic arm 53 are respectively connected with the other ends of the first fixing arm 51 and second fixing arm 52.

Embodiment 2

Figure 8:
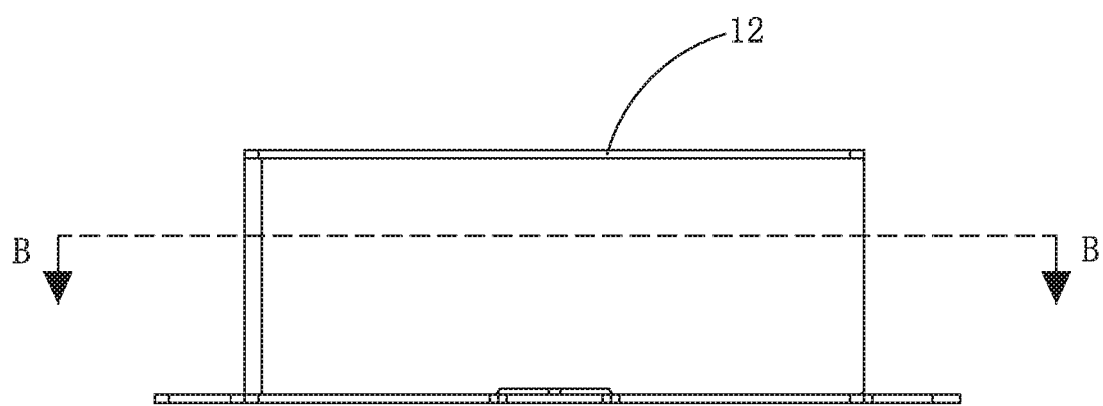
FIG. 8 is a left view of a motor according to Embodiment 2 of the present disclosure.
Figure 9:
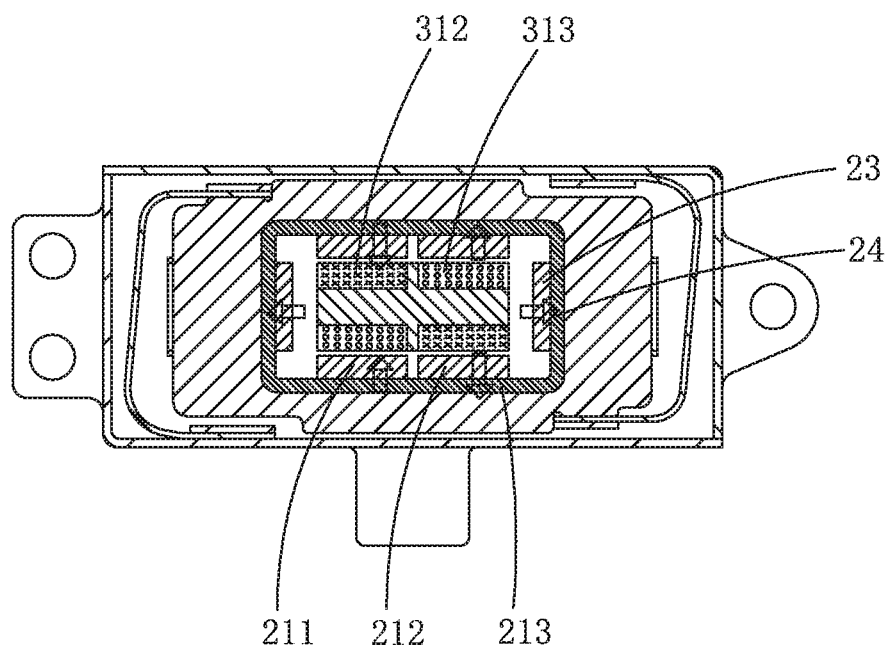
FIG. 9 is a sectional view of B-B in FIG. 8.

Referring to FIG. 8 to FIG. 9, a motor 1 provided in Embodiment 2 is distinguished from the motor 1 provided in Embodiment 1 in that, a magnetic circuit structure 21 of the motor 1 in Embodiment 2 further includes a third magnetic steel 23 and a pole core 24.

Specifically, in this embodiment, there are two third magnetic steels 23 and two pole cores 24. The two third magnetic steels 23 are respectively located at two opposite sides of the coil assembly 31. The third magnetic steels 23 are installed on a second side wall 222 and are disposed separate from and opposite to the coil assembly 31. A pole core 24 is sandwiched between a third magnetic steel 23 and the second side wall 222. An induced magnetic field generated when the first drive coil 312 and the second drive coil 313 are powered on interacts with a permanent magnetic field generated by the third magnetic steel 23, thereby stress to the vibrator 20 may be further increased, and vibration of the motor 1 may be improved.

The above are only embodiments of the present disclosure. It shall be indicated that those of ordinary skill in the art can make improvements without departing from the creative concept of the present disclosure, and these belong to the protection scope of the present disclosure.

What is claimed is:

1. A motor, comprising
a housing having an accommodating space, and
a vibrator and a stator that are accommodated in the accommodating space;
wherein one of the vibrator and the stator comprises a magnetic circuit structure, and the other comprises a coil assembly;
the coil assembly comprises an iron core, a first drive coil and a second drive coil that separately sleeved on two ends of the iron core in a vibration direction of the vibrator; a powering direction of the first drive coil being opposite to a powering direction of the second drive coil;
the magnetic circuit structure comprises a first magnetic steel disposed at two sides where poles with the same polarity are facing each other of the first drive coil in a direction perpendicular to the vibration direction, and a second magnetic steel disposed at two sides where poles with the same polarity are facing each other of the second drive coil in a direction perpendicular to the vibration direction; and
the first magnetic steel and the second magnetic steel that are at the same side of the coil assembly are magnetized in a direction perpendicular to the vibration direction; the first magnetic steel and the second magnetic steel that are at the same side of the coil assembly are magnetized in opposite directions.

2. The motor according to claim 1, wherein the motor comprises even numbers of first magnetic steels and second magnetic steels respectively, each two of the first magnetic steels as a group are symmetrically disposed at two opposite sides of the first drive coil, and each two of the second magnetic steels as a group are symmetrically disposed at two opposite sides of the second drive coil.

3. The motor according to claim 2, wherein the magnetic circuit structure further comprises a magnetic conductive member that fixes the first magnetic steel and the second magnetic steel, the magnetic conductive member disposed separately at two opposite sides of the coil assembly.

4. The motor according to claim 3, wherein the vibrator further comprises a weight block, the magnetic circuit structure is fixed within the weight block, the weight block is suspended within the accommodating space;
the weight block comprises two first side walls disposed in parallel and spaced apart, and two second side walls disposed at two ends of the first side walls and connecting the two first side walls; the first side walls and the second side walls are connected end to end to form an accommodating cavity;
the magnetic circuit structure and the coil assembly are fixed within the accommodating cavity, the magnetic conductive member is fixed on the first side walls, and the coil assembly is fixed within the housing and extends into the accommodating cavity.

5. The motor according to claim 4, wherein the motor further comprises a third magnetic steel located at two opposite sides of the coil assembly, and the third magnetic steel is installed on the second side walls and is disposed at intervals opposite to the coil assembly.

6. The motor according to claim 5, wherein the motor further comprises a pole core sandwiched between the third magnetic steel and the second side wall.

7. The motor according to claim 1, wherein the iron core comprises a body portion extending in the vibration direction and a separation portion protruding at the body portion, the first drive coil and the second drive coil are separately sleeved on two sides of the body portion, and the separation portion is sandwiched between the first drive coil and the second drive coil.

8. The motor according to claim 2, wherein the iron core comprises a body portion extending in the vibration direction and a separation portion protruding at the body portion, the first drive coil and the second drive coil are separately sleeved on two sides of the body portion, and the separation portion is sandwiched between the first drive coil and the second drive coil.

9. The motor according to claim 3, wherein the iron core comprises a body portion extending in the vibration direction and a separation portion protruding at the body portion, the first drive coil and the second drive coil are separately sleeved on two sides of the body portion, and the separation portion is sandwiched between the first drive coil and the second drive coil.

10. The motor according to claim 4, wherein the iron core comprises a body portion extending in the vibration direction and a separation portion protruding at the body portion, the first drive coil and the second drive coil are separately sleeved on two sides of the body portion, and the separation portion is sandwiched between the first drive coil and the second drive coil.

11. The motor according to claim 5, wherein the iron core comprises a body portion extending in the vibration direction and a separation portion protruding at the body portion, the first drive coil and the second drive coil are separately sleeved on two sides of the body portion, and the separation portion is sandwiched between the first drive coil and the second drive coil.

12. The motor according to claim 6, wherein the iron core comprises a body portion extending in the vibration direction and a separation portion protruding at the body portion, the first drive coil and the second drive coil are separately sleeved on two sides of the body portion, and the separation portion is sandwiched between the first drive coil and the second drive coil.

13. The motor according to claim 7, wherein the separation portion is of a ring sheathing the body portion.

14. The motor according to claim 1, wherein the motor further comprises a plurality of stopping blocks protruding from the housing, and the vibrator is correspondingly provided with recessing grooves matching the stopping blocks.

15. The motor according to claim 2, wherein the motor further comprises a plurality of stopping blocks protruding from the housing, and the vibrator is correspondingly provided with recessing grooves matching the stopping blocks.

16. The motor according to claim 3, wherein the motor further comprises a plurality of stopping blocks protruding from the housing, and the vibrator is correspondingly provided with recessing grooves matching the stopping blocks.

17. The motor according to claim 4, wherein the motor further comprises a plurality of stopping blocks protruding from the housing, and the vibrator is correspondingly provided with recessing grooves matching the stopping blocks.

18. The motor according to claim 5, wherein the motor further comprises a plurality of stopping blocks protruding from the housing, and the vibrator is correspondingly provided with recessing grooves matching the stopping blocks.

19. The motor according to claim 6, wherein the motor further comprises a plurality of stopping blocks protruding from the housing, and the vibrator is correspondingly provided with recessing grooves matching the stopping blocks.

20. The motor according to claim 1, wherein the motor further comprises an elastic support suspending the vibrator and supporting the vibrator in the accommodating space;

the elastic support comprises a first fixing arm fixed to the housing, a second fixing arm disposed separated from the first fixing arm and fixed to the vibrator, and an elastic arm connecting the first fixing arm and the second fixing arm.

\* \* \* \* \*